US012551986B2

(12) United States Patent
Springer

(10) Patent No.: US 12,551,986 B2
(45) Date of Patent: Feb. 17, 2026

(54) SYSTEMS AND METHODS FOR SUSPENDING CLAMPED PROJECTS

(71) Applicant: Reid Springer, Wausau, WI (US)

(72) Inventor: Reid Springer, Wausau, WI (US)

( * ) Notice: Subject to any disclaimer, the term of this patent is extended or adjusted under 35 U.S.C. 154(b) by 0 days.

(21) Appl. No.: 19/013,299

(22) Filed: Jan. 8, 2025

(65) Prior Publication Data

US 2025/0229381 A1 Jul. 17, 2025

Related U.S. Application Data

(60) Provisional application No. 63/620,603, filed on Jan. 12, 2024.

(51) Int. Cl.
*B25B 5/00* (2006.01)

(52) U.S. Cl.
CPC .................................... *B25B 5/006* (2013.01)

(58) Field of Classification Search
CPC .... B25B 5/00; B25B 5/02; B25B 5/04; B25B 5/006
See application file for complete search history.

(56) References Cited

U.S. PATENT DOCUMENTS

| | | | | |
|---|---|---|---|---|
| 52,958 A * | 3/1866 | Briggs | B25B 1/12 | 269/171 |
| 3,508,665 A | 4/1970 | Goldstein | | |
| 6,039,313 A * | 3/2000 | Baculy | B25B 5/068 | 269/282 |
| 6,234,328 B1 | 5/2001 | Mason | | |
| 6,554,264 B1 * | 4/2003 | Alford | B25B 5/145 | 269/147 |
| 6,971,641 B1 * | 12/2005 | Sherwin | B25B 5/10 | 269/166 |
| 7,398,966 B2 * | 7/2008 | Hubbard | B25B 5/068 | 403/294 |
| 11,110,559 B2 | 9/2021 | Cross | | |
| 2014/0252711 A1 * | 9/2014 | Tropea | B25B 1/02 | 29/559 |
| 2022/0395963 A1 | 12/2022 | Draeger | | |
| 2025/0229381 A1 * | 7/2025 | Springer | B25B 5/068 | |
| 2025/0303524 A1 * | 10/2025 | Springer | B25B 5/02 | |

* cited by examiner

*Primary Examiner* — Lee D Wilson
(74) *Attorney, Agent, or Firm* — Andrus Intellectual Property Law, LLP

(57) ABSTRACT

A clamped project bracket assembly is provided. The assembly includes a first and a second suspension clamp assembly. Each suspension clamp assembly includes at least one suspension clamp portion configured to couple to a clamp assembly configured to hold a clamped project and a pair of locating pins extending from the at least one suspension clamp portion. The assembly further includes a mounting bracket comprising a pair of pin retention grooves and a pair of pin positioning grooves formed at least partially therethrough. The pair of locating pins of the first suspension clamp assembly are configured to travel within the pair of pin retention grooves and the pair of locating pins of the second suspension clamp assembly are configured to travel within the pair of pin positioning grooves to position the clamp assembly at one of multiple discrete orientations.

20 Claims, 14 Drawing Sheets

SECTION A–A

SYSTEMS AND METHODS FOR SUSPENDING CLAMPED PROJECTS

CROSS-REFERENCE TO RELATED PATENT APPLICATION

The present application claims the benefit of U.S. Provisional Application Ser. No. 63/620,603, filed Jan. 12, 2024, which is incorporated by reference herein in its entirety.

FIELD

The present application relates to tools used in holding projects such as woodworking projects, and more specifically to bracket assemblies for suspending clamped projects.

BACKGROUND

Various projects, and particularly woodworking projects, require a period in which the project is clamped using various types of clamp assemblies to permit a glue or other adhesive to cure. Such curing periods can exceed 24 hours and often require a large amount of space during which time the project simply sits and is not actively worked on. Suspending the projects from a wall or other vertical surface of a workspace is advantageous to minimize the space consumed by the clamped projects and to prevent disruption of the clamped projects. Many present solutions for suspending clamped projects incorporate pneumatics and are expensive and impractical for hobbyists and small operations.

SUMMARY

According to one implementation of the present disclosure, a clamped project bracket assembly is provided. The assembly includes a first and a second suspension clamp assembly. Each suspension clamp assembly includes at least one suspension clamp portion configured to couple to a clamp assembly configured to hold a clamped project and a pair of locating pins extending from the at least one suspension clamp portion. The assembly further includes a mounting bracket comprising a pair of pin retention grooves and a pair of pin positioning grooves formed at least partially therethrough. The pair of locating pins of the first suspension clamp assembly are configured to travel within the pair of pin retention grooves and the pair of locating pins of the second suspension clamp assembly are configured to travel within the pair of pin positioning grooves to position the clamp assembly at one of multiple discrete orientations.

According to another implementation of the present disclosure, a mounting bracket utilized in a clamped project bracket assembly is provided. The mounting bracket includes a mounting surface bracket component configured to couple to a mounting surface and a pair of side bracket components. Each of the side bracket components includes a pin retention groove and a pin positioning groove formed at least partially therethrough. Each of the pin retention grooves is configured to receive a pin from a first suspension clamp assembly coupled to a clamp assembly configured to hold a clamped project and each of the pin positioning grooves is configured to receive a pin from a second suspension clamp assembly coupled to the clamp assembly.

According to yet another implementation of the present disclosure, a method for suspending a clamped project from a clamped project bracket assembly is provided. The method includes providing a mounting bracket comprising a pair of pin retention grooves and a pair of pin positioning grooves formed at least partially therethrough and coupling a first and a second suspension clamp assembly to a clamp assembly configured to hold a clamped project. Each suspension clamp assembly includes at least one suspension clamp portion and a pair of locating pins extending from the at least one suspension clamp portion. The method further includes inserting the pair of locating pins of the first suspension clamp assembly into the pair of pin retention grooves and inserting the pair of locating pins of the second suspension clamp assembly into the pair of pin positioning grooves to position the clamp assembly at one of multiple discrete orientations.

BRIEF DESCRIPTION OF DRAWINGS

Examples of bracket assemblies and portions thereof are described with reference to the following Figures. The same numbers are used throughout the Figures to reference like features and like components.

DETAILED DESCRIPTION

Figure 1:
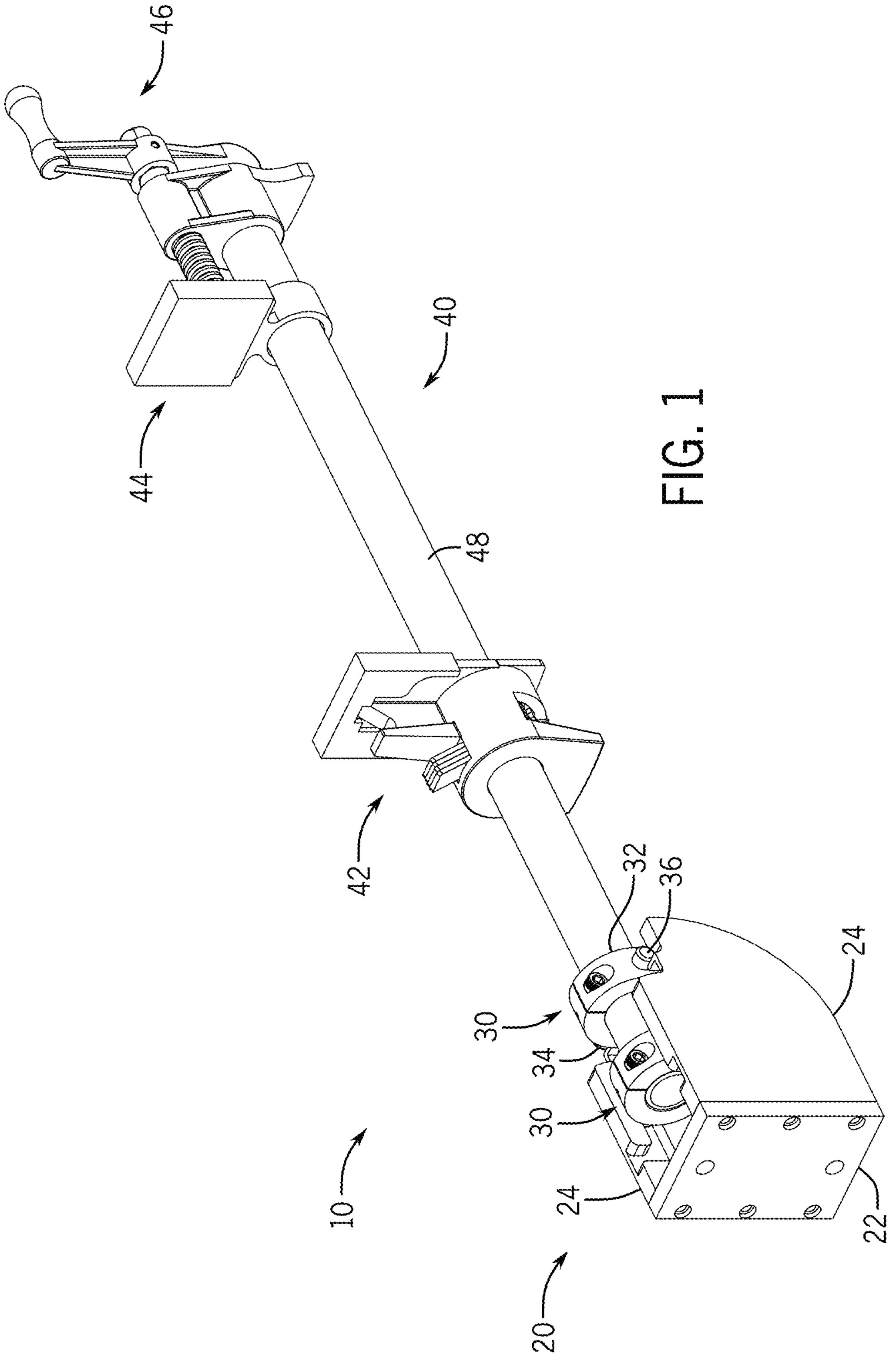
FIG. 1 is a perspective view of a clamped project bracket assembly according to an exemplary implementation of the present disclosure.
Figure 2:
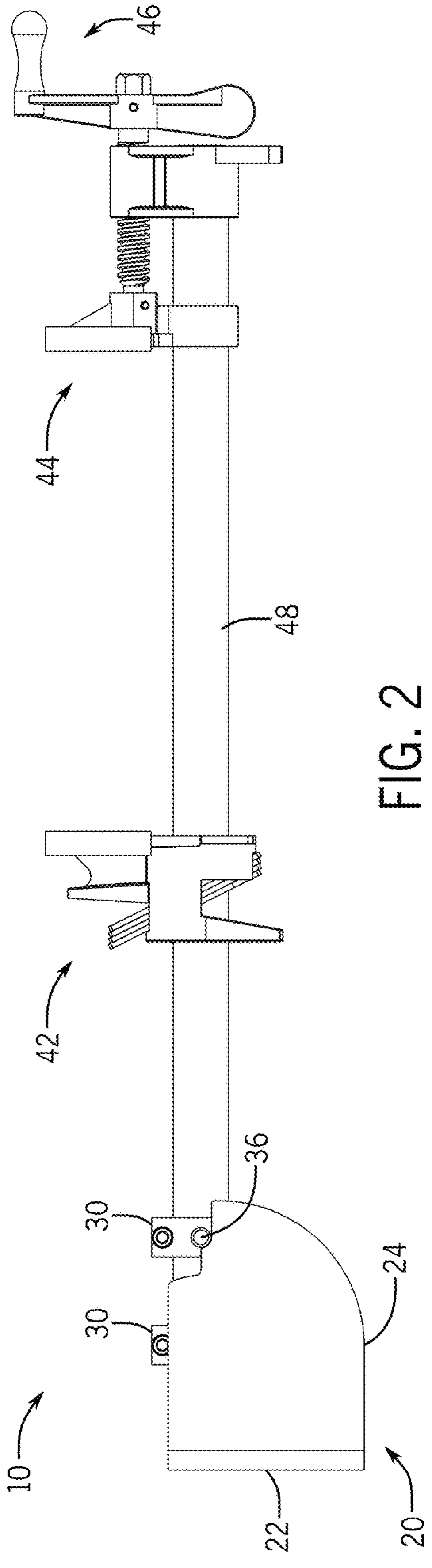
FIG. 2 is a side view of the clamped project bracket assembly of FIG. 1.
Figure 3:
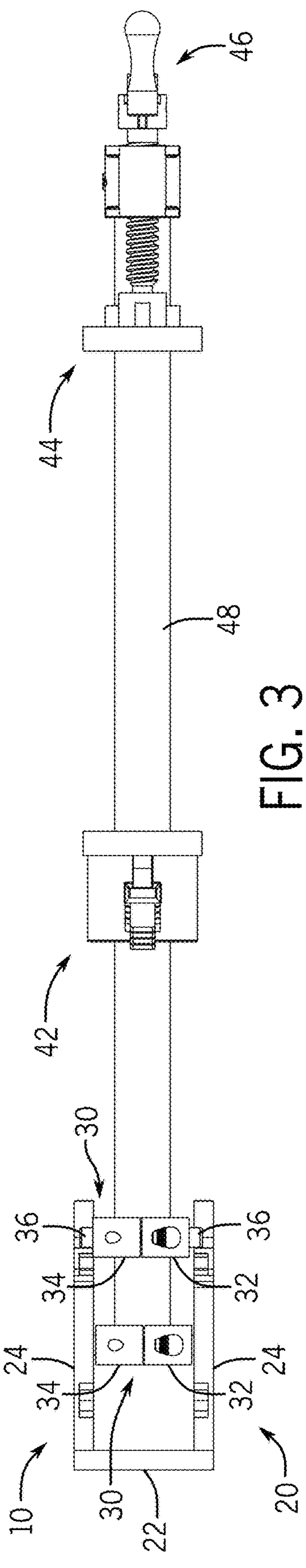
FIG. 3 is a top view of the clamped project bracket assembly of FIG. 1.

The present application relates to systems and methods for suspending various projects, and particularly woodworking projects, during a period in which the project is clamped using various types of clamp assemblies to permit a glue or other adhesive to cure. The present inventor has recognized that providing a simple mechanical bracket system that attaches to an existing project clamp assembly and permits suspension of a clamped project in a variety of possible positions during the curing process would be useful. FIGS. 1-3 depict a clamped project bracket assembly 10 according to an exemplary implementation of the present disclosure. The clamped project bracket assembly 10 is shown to include a mounting bracket assembly 20, a pair of suspension clamp assemblies 30, and a project clamp assembly 40.

The project clamp assembly 40 may be any suitable type of clamp that is utilized to clamp projects together for drying or curing purposes. Clamps may also be utilized as fixtures or anchors to hold projects in a fixed position on a work bench while the projects are worked on (e.g., sanding, sawing, shaping). As depicted in the FIGURES, the project clamp assembly 40 is a pipe-style clamp assembly with a first clamp portion 42 that is configured to slide relative to a pipe 48 to accommodate projects of different sizes. In other embodiments, the assembly 40 could be a bar-style clamp assembly. The clamp assembly 40 is further shown to include a second clamp portion 44 that is configured to have its position adjusted relative to the pipe 48 by an adjustment mechanism 46 and thereby apply a clamping force to a project positioned between the first clamp portion 42 and the second clamp portion 44. The adjustment mechanism 46 depicted in the FIGURES is a threaded connection to the second clamp portion 44 that is operated via rotation of a handle, but any suitable adjustment mechanism to modify the position of the second clamp portion 44 may be utilized.

Figure 5:
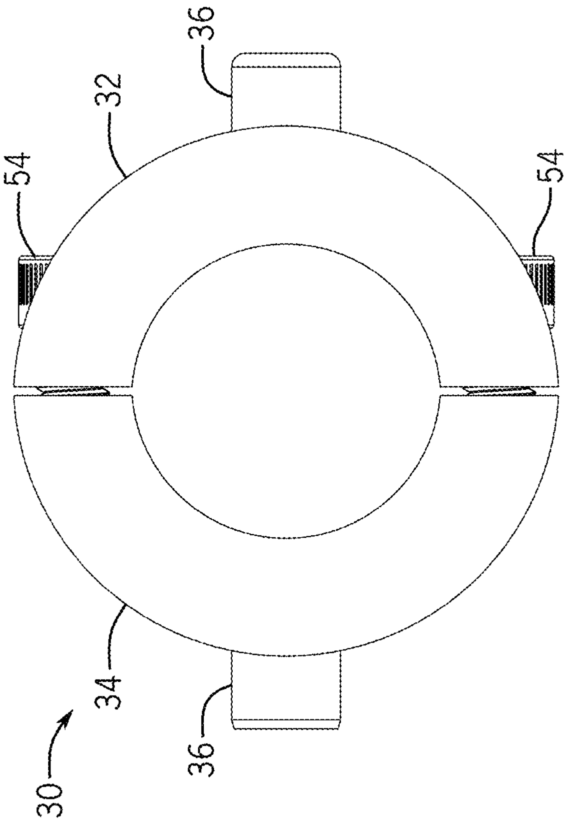
FIG. 5 is a front view of the suspension clamp assembly of FIG. 4.
Figure 6:
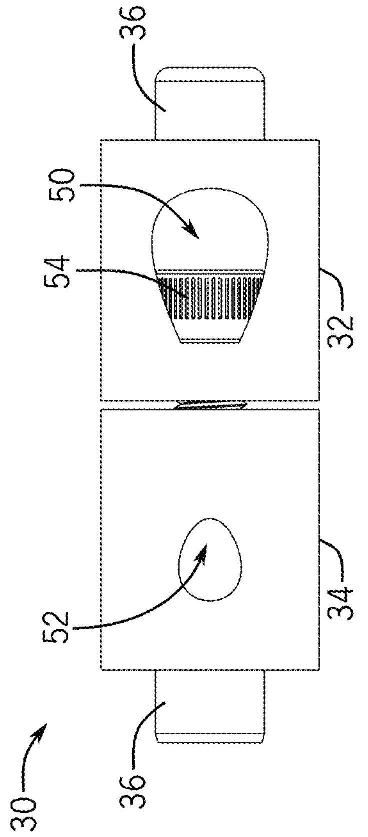
FIG. 6 is a top view of the suspension clamp assembly of FIG. 4.
Figure 4:
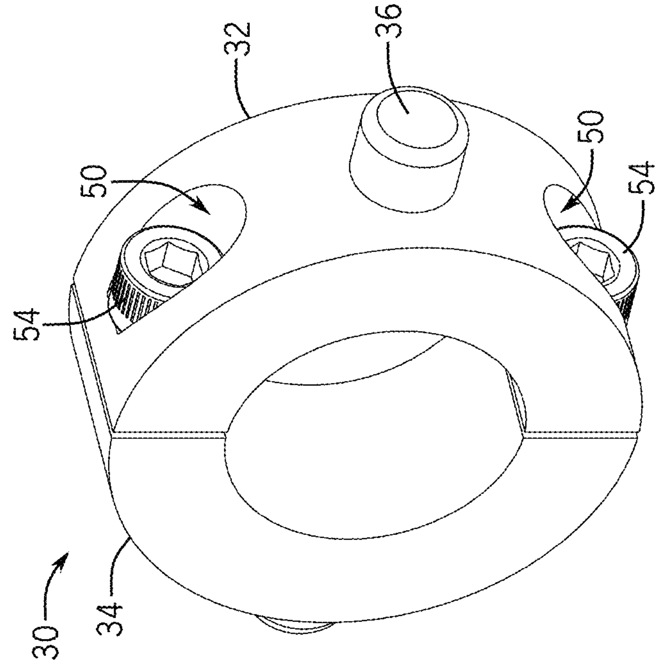
FIG. 4 is a perspective view of a suspension clamp assembly that may be utilized in the clamped project bracket assembly of FIG. 1.

The project clamp assembly 40 is configured to be suspended from the mounting bracket assembly 20 via a pair of suspension clamp assemblies 30. As best shown in FIGS. 4-6, each of the suspension clamp assemblies is shown to include a first suspension clamp portion 32 and a second suspension clamp portion 34. In the implementation depicted in the FIGURES, both of the clamp portions 32, 34 are generally C-shaped to receive and clamp around an end portion of the pipe 48 of the clamp assembly 40 because the pipe 48 has a circular cross-section. In other exemplary implementations, the structural member of the clamp assembly used to retain and locate the first and second clamp portions 42, 44 may have a non-circular shaped cross-section (e.g., rectangular, square, I-shaped), and the shapes of the clamp portions 32, 34 may be adjusted accordingly to fit flush around the non-circular structural members (e.g., a bar member if the clamp assembly 40 is a bar-type clamp assembly). For example, the clamp portions 32, 34 may be generally U-shaped to receive and clamp around a rectangular or square shaped cross-section.

The clamp portions 32, 34 are configured to be joined to each other and apply a clamping force to the pipe 48 via a pair of threaded clamp fasteners 54 that pass through holes 50 formed in the first suspension clamp portion 32 and are received by threaded holes 52 formed in the second suspension clamp portion 34. The type, number, and positions of the threaded fasteners 54 are not particularly limited and may be provided such that the clamp portions 32, 34 are securely retained to the pipe 48. In an exemplary implementation, the clamp fasteners 54 are intended to be removable such that the clamp assemblies 30 can be removed from the project clamp assembly 40. However, in other implementations, the clamp fasteners 54 may be permanently secured in the threaded holes 52 provided in the second suspension clamp portion 34, or the clamp assemblies 30 may be secured to the pipe 48 via a method other than fasteners (e.g., welding) such that the clamp assemblies 30 are permanently affixed to the project clamp assembly 40. The present inventor has recognized that by locating the pair of suspension clamp assemblies 30 at an end of the pipe 48, the operation of the project clamp assembly 40 is not impeded, and a wide variety of projects may be clamped within the clamp assembly 40.

Each of the first and second suspension clamp portions 32, 34 is further shown to include a locating pin 36. As described in further detail below with reference to FIGS. 7-19, the locating pins 36 are configured to travel within tracks or grooves formed in the mounting bracket assembly 20 to permit the project clamp assembly 40 to be suspended at a variety of orientations from the mounting bracket assembly 20. In an exemplary implementation, the locating pins 36 are dowel pins that are assembled to the clamp portions 32, 34 using a press fit assembly process. In other implementations, another style of pin (e.g., a stud that is threaded on one end) or assembly method may be utilized.

Figure 7:
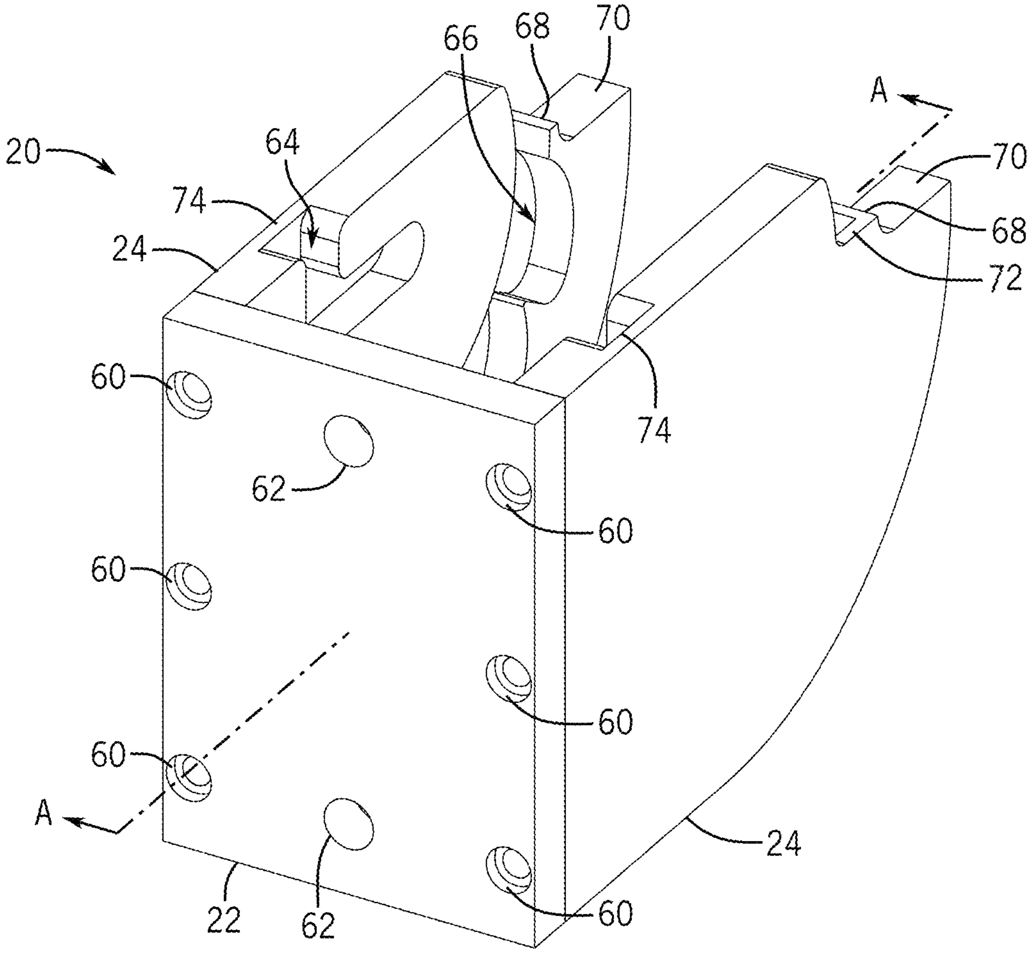
FIG. 7 is a perspective view of a mounting bracket assembly that may be utilized in the clamped project bracket assembly of FIG. 1.
Figure 8:
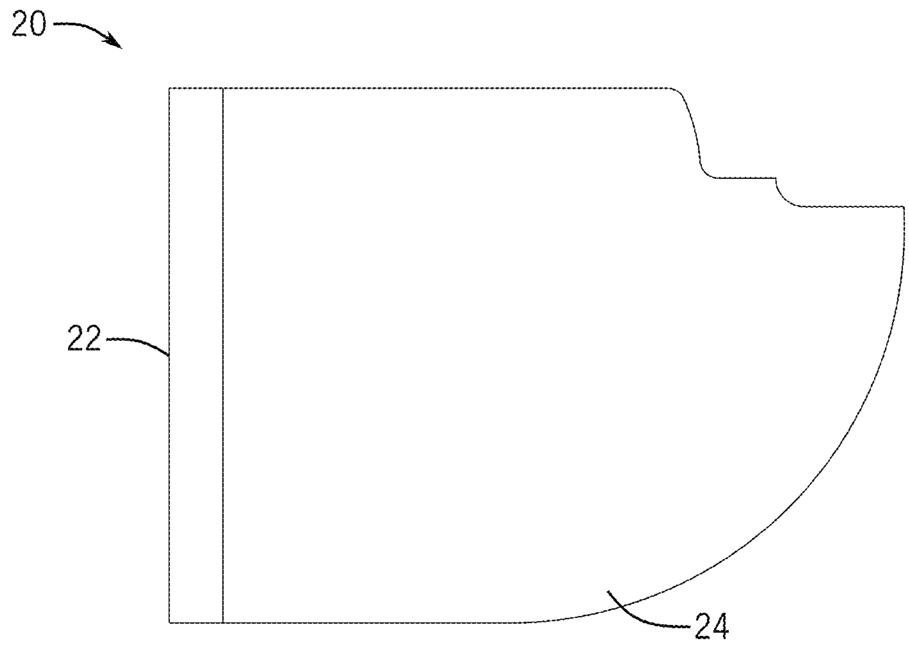
FIG. 8 is a side view of the mounting bracket assembly of FIG. 7.
Figure 9:
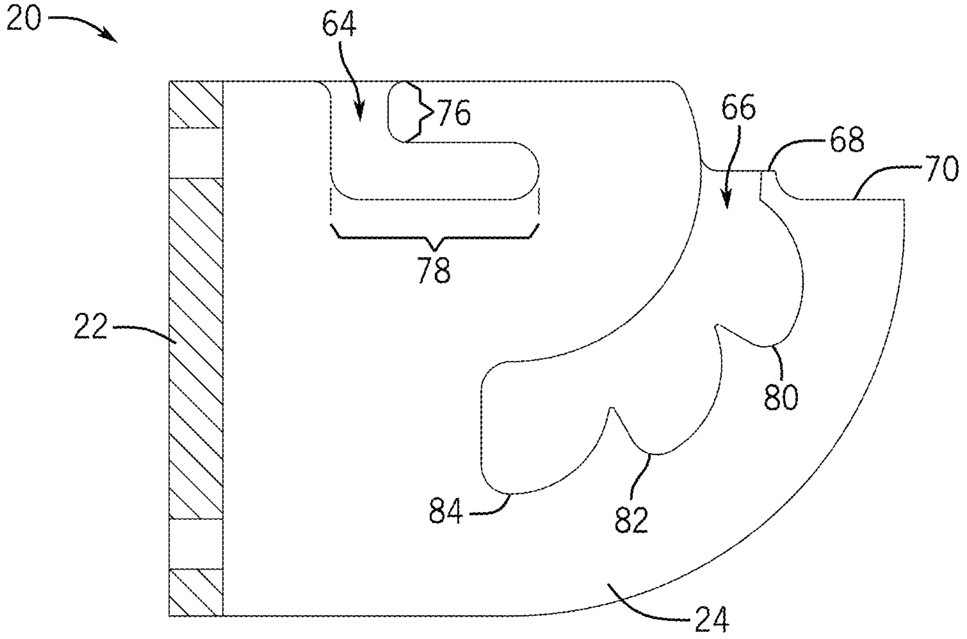
FIG. 9 is a side cross-sectional view of the mounting bracket assembly taken along the line A-A of FIG. 7.

Turning to FIGS. 7-9, views of the mounting bracket assembly 20 are depicted. Specifically, FIG. 7 depicts a front perspective view of the assembly 20, FIG. 8 is a side view, and FIG. 9 is a side cross-sectional view taken along the line A-A of FIG. 7. As shown, the assembly 20 includes a mounting surface bracket component 22 and a pair of symmetrically configured side bracket components 24. The material utilized for the bracket components 22, 24 is not particularly limited and could be metal (e.g., 6061 aluminum) or plastic (e.g., ABS). The mounting surface bracket component 22 is shown to be coupled to the pair of side bracket components 24 using multiple fastener holes 60 formed in the bracket component 22. Fasteners (not shown) may be provided corresponding to the holes 60 to secure the side bracket components 24 to the mounting surface bracket component 22. The mounting surface bracket component 22 is further shown to include a pair of mounting holes 62 that may be utilized to couple the mounting bracket assembly 20 to a wall or other vertical surface using any type of suitable fastener. Although FIG. 7 depicts the mounting surface bracket component 22 as including a pair of mounting holes 62, in other implementations, a different number of mounting holes in a different hole pattern may be included in the mounting surface bracket 22.

As best depicted in FIGS. 8 and 9, each of the pair of side bracket components 24 includes multiple features configured to receive the locating pins 36 of the clamp assemblies 30, and thereby position the project clamp assembly 40 in multiple configurations. Once such feature is a pin retention track or groove 64 that is formed in the side bracket component 24 proximate the mounting surface bracket component 22. The pin retention track 64 is shown to include a generally vertical track portion 76 and a generally horizontal track portion 78. The generally vertical track portion 76 of the retention track 64 may be configured to permit the insertion or removal of the clamp assemblies 30 from the mounting bracket assembly 20 (see FIGS. 18 and 19, described in further detail below). The generally horizontal track portion 78 of the retention track 64 may be configured to permit a pair of locating pins 36 to slide therein to position the project clamp assembly 40 at a desired angle (see FIGS. 10-17, described in further detail below).

Figure 21:
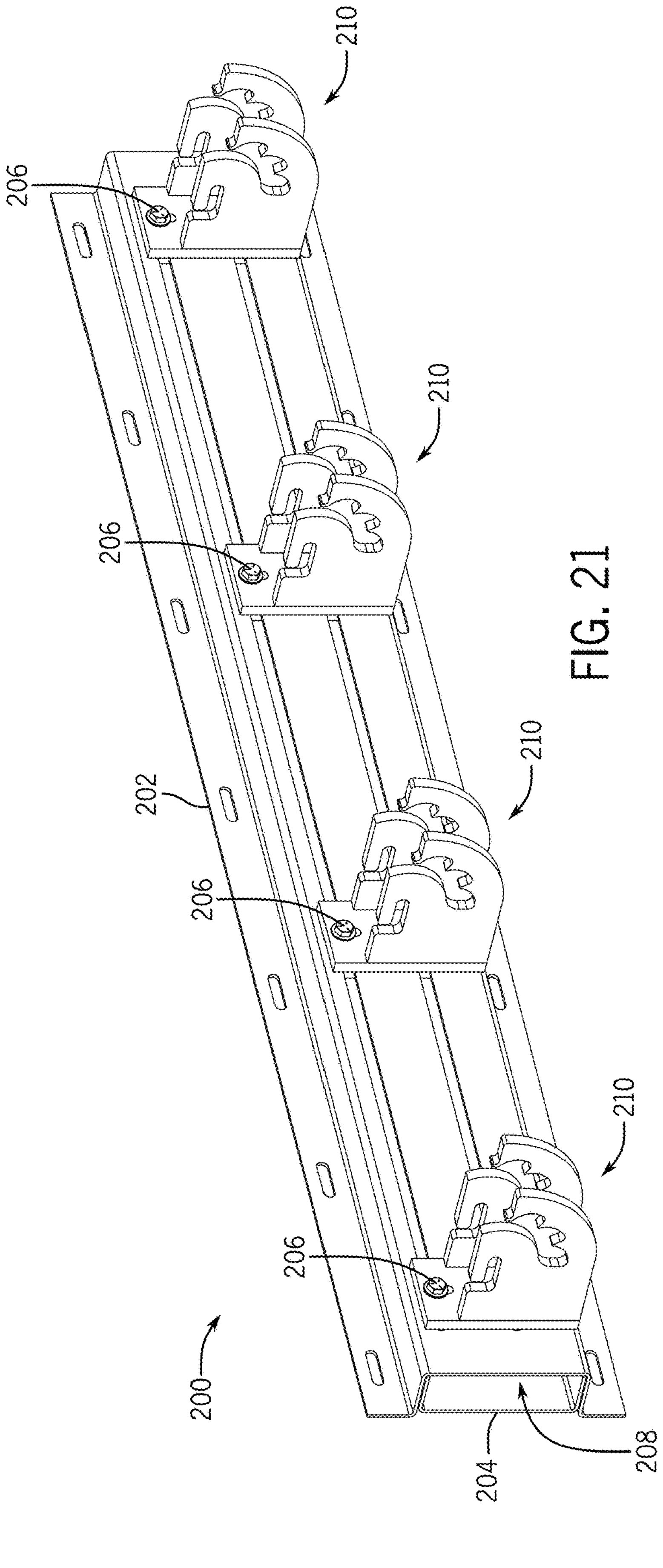
FIG. 21 is a perspective view of another exemplary implementation of the present disclosure including multiple mounting bracket assemblies coupled to an adjustable track bracket.
Figure 22:
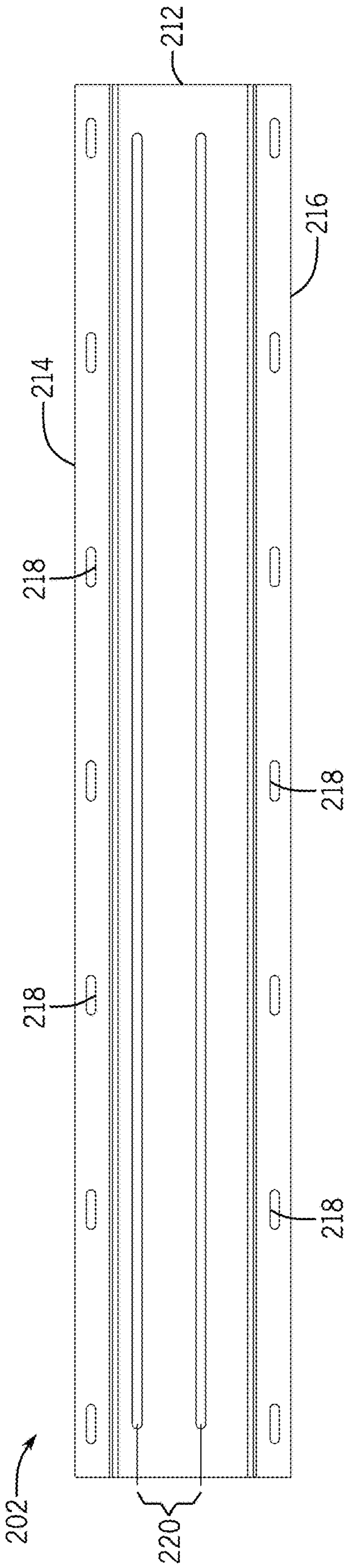
FIG. 22 is a front view of the adjustable track bracket of FIG. 21.

Each of the side bracket components 24 is further shown to include a positioning track 66 that is spaced apart from the retention track 64. In an exemplary embodiment, the positioning track 66 is generally arc-shaped with multiple pin rest locations 80-84 that permit the project clamp assembly 40 to be positioned at a variety of angles relative to horizontal. For example, pin rest location 80 permits the project clamp assembly 40 to be positioned at an orientation 30° below horizontal (see also FIGS. 12 and 13), while pin rest location 82 permits the project clamp assembly 40 to be positioned at an orientation 60° below horizontal (see also FIGS. 14 and 15), and pin rest location 84 permits the project clamp assembly 40 to be positioned at an orientation 90° below horizontal, i.e., a vertical position (see also FIGS. 16 and 17). The configuration of the positioning track 66 depicted in the FIGURES is merely exemplary and, in other implementations, the positioning track 66 may include greater or fewer pin rest locations. For example, a pin rest location could permit the project clamp assembly 40 to be positioned at an orientation 45° below horizontal. Furthermore, in an exemplary embodiment, the pin retention track 64 and the positioning track 66 are provided in the side bracket components 24 such that they are only formed as grooves or tracks, i.e., they do not fully extend through the side bracket components 24 as slots such that strengthening walls 72, 74 (see FIG. 7) are provided behind the tracks 64, 66. In other implementations, depending on the strength of the material utilized for the bracket components 22, 24 and the weight and size of the project clamp assembly 40 and the clamped project, strengthening walls 72, 74 may be omitted and one or both of the tracks 64, 66 may be formed as slots that extend through the full thickness of the side bracket component 24 (see e.g., FIGS. 21 and 25, described in further detail below).

Figure 10:
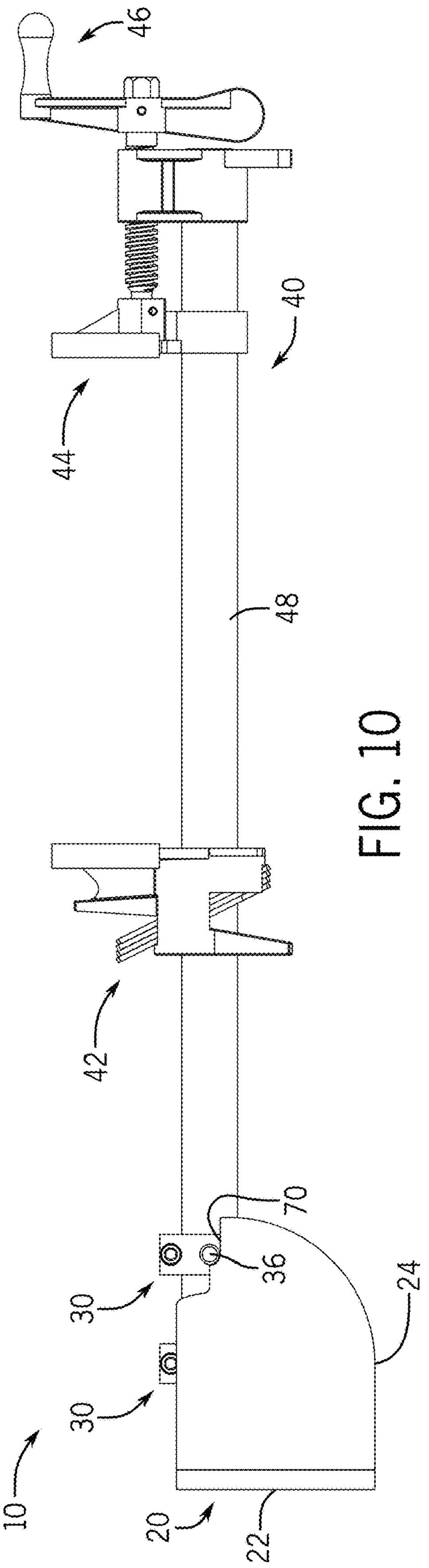
FIG. 10 is a side view of the clamped project bracket assembly in a horizontal suspension configuration.
Figure 11:
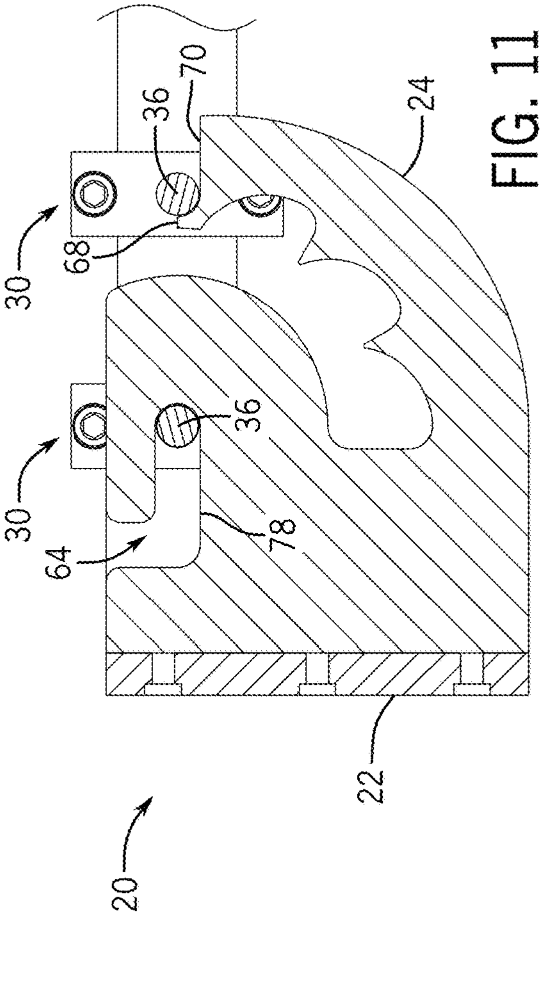
FIG. 11 is a side cross-sectional view of the clamped project bracket assembly in the horizontal suspension configuration.

The side bracket components are further shown to include a filleted lip 68 and a horizontal rest surface 70 that permit the project clamp assembly 40 to be positioned in a horizontal configuration. As shown in FIGS. 10 and 11, to position the project clamp assembly 40 in this way, a user may insert the locating pins 36 of the clamp assembly 30 that is closer to the mounting surface bracket component 22 into the retention track 64 of each side bracket component 24. By maneuvering these locating pins 36 into the horizontal track portions 78 and the other pair of locating pins 36 over the filleted lips 68 and onto the horizontal rest surfaces 70, the pipe 48 of the project clamp assembly 40 is generally aligned horizontally, and a user can easily adjust the first and second clamp portions 42, 44 to load and unload a project into or from the project clamp assembly 40. The inclusion of the rounded surfaces on the filleted lips 68 ensures that the locating pins 36 fit flush against the mounting bracket assembly 20 and unwanted relative movement between the project clamp assembly 40 and the mounting bracket assembly 20 is avoided.

The configuration depicted in FIGS. 10 and 11 may further be utilized when initially coupling to the clamp assemblies 30 to the project clamp assembly 40 to ensure that proper spacing is maintained between the clamp assemblies 30: a user may first position the clamp assembly 30 that is configured to travel within the retention track 64 at the end of the pipe 48 and may tighten the threaded clamp fasteners 54 (see FIGS. 4-6) to apply a clamping force to the pipe 48 and lock the position of the clamp assembly 30 relative to the pipe 48. The user may then insert the locating pins 36 of the fixed clamp assembly 30 into the retention track 64 and pull the project clamp assembly 40 away from the mounting surface bracket component 22, so that the locating pins 36 arc positioned within the horizontal track portions 78 as shown in FIG. 11. The user can then loosely attach the other clamp assembly 30 to the pipe 48 and slide that clamp assembly 30 until its locating pins 36 butt up against the filleted lips 36, again, as shown in FIG. 11. Finally, the user can tighten the threaded clamp fasteners 54 of the second clamp assembly 30 to lock the position relative to the pipe 48.

Figure 13:
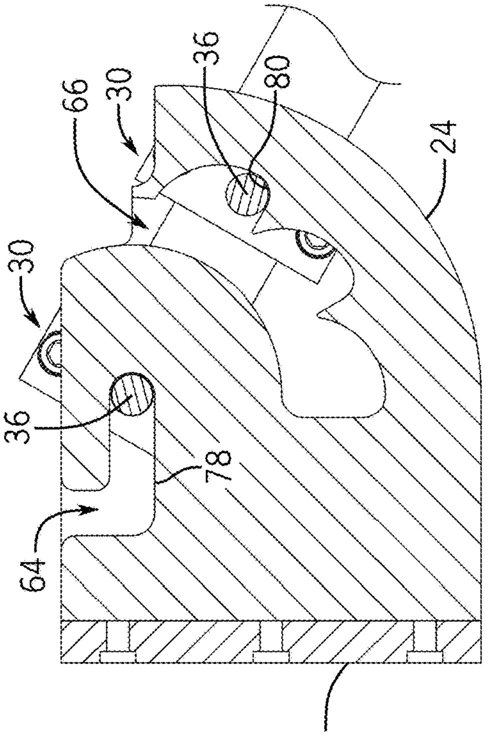
FIG. 13 is a side cross-sectional view of the clamped project bracket assembly in the first angled suspension configuration.
Figure 12:
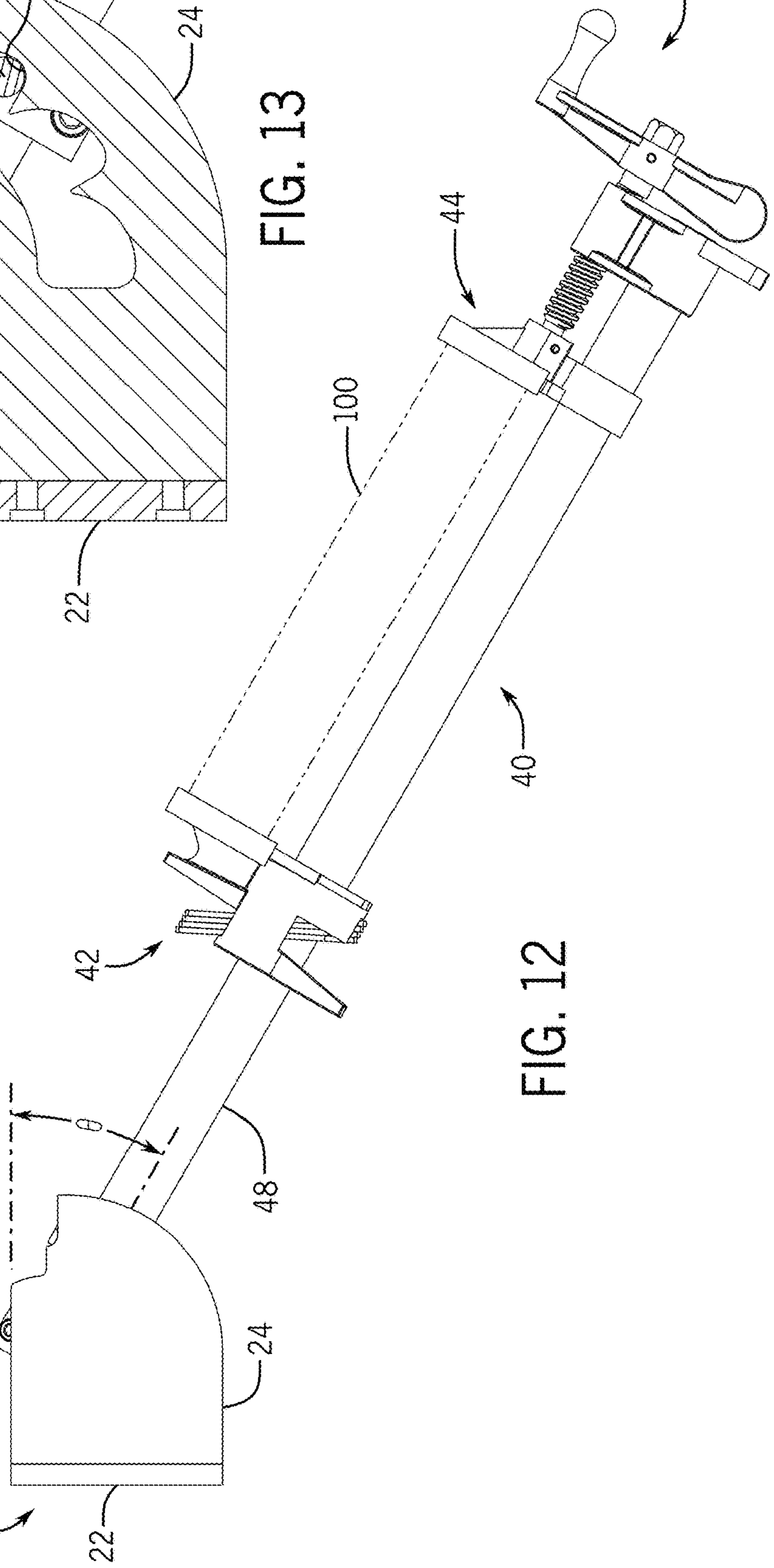
FIG. 12 is a side view of the clamped project bracket assembly in a first angled suspension configuration.
Figures 14, 15:
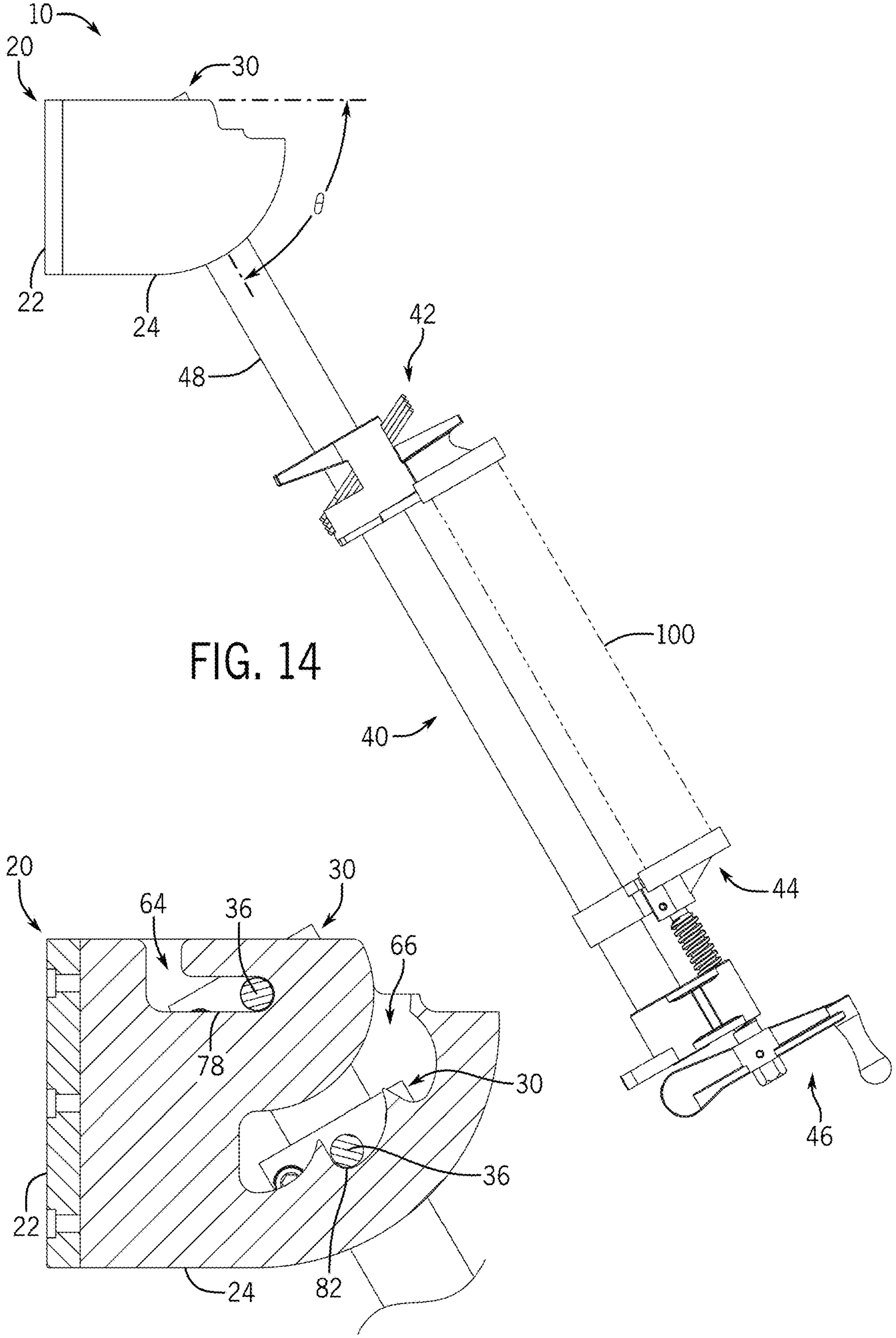
FIG. 14 is a side view of the clamped project bracket assembly in a second angled suspension configuration.
FIG. 15 is a side cross-sectional view of the clamped project bracket assembly in the second angled suspension configuration.
Figure 16:
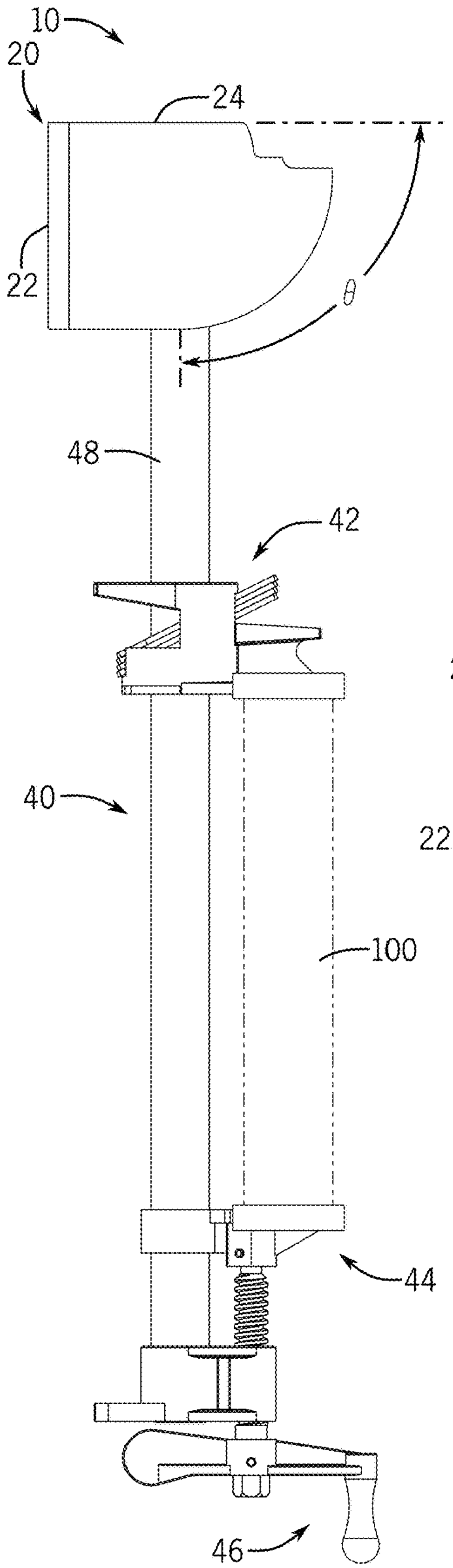
FIG. 16 is a side view of the clamped project bracket assembly in a vertical suspension configuration.
Figure 17:
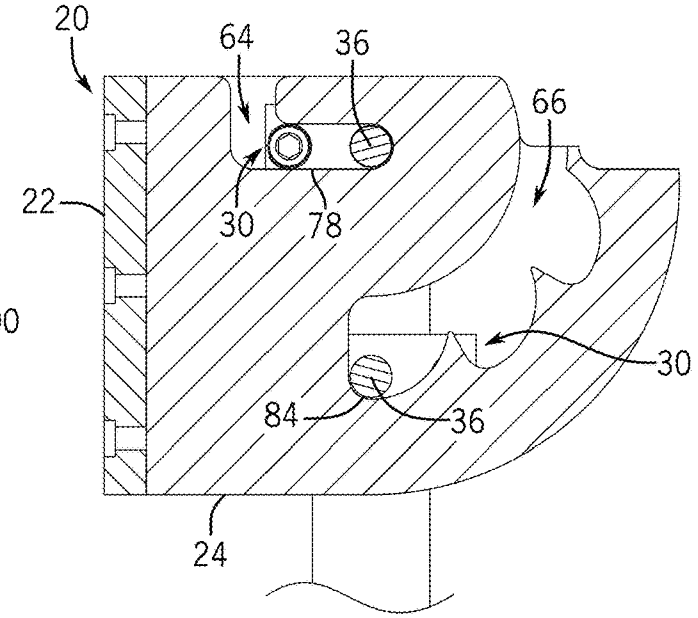
FIG. 17 is a side cross-sectional view of the clamped project bracket assembly in the vertical suspension configuration.

FIGS. 12-19 further depict a project 100 clamped within the clamp project bracket assembly 10 in a variety of positional configurations based on the positions of the locating pins 36 within the positioning track 64. As shown in FIGS. 12 and 13, the locating pins 36 of the clamp assembly 30 that is located further from the mounting surface bracket component 22 rest within the pin rest locations 80. Accordingly, the angle θ between the horizontal and the pipe 48 of the project clamp assembly 40 is approximately 30°. As shown in FIGS. 14 and 15, the locating pins 36 rest within the pin rest locations 82, and the angle θ between the horizontal and the pipe 48 of the project clamp assembly 40 is approximately 60°. As shown in FIGS. 16 and 17, the locating pins 36 rest within the pin rest locations 84, and the angle θ between the horizontal and the pipe 48 of the project clamp assembly 40 is approximately 90°. By providing multiple pin rest locations 80-84 within the positioning track 64, multiple clamp project bracket assemblies 10 may be positioned in close vertical proximity to each other without contact between the project clamp assemblies 40. For example, a lowermost bracket assembly 10 could include locating pins 36 within the pin rest locations 84, a middle bracket assembly 10 could include locating pins 36 within the pin rest locations 82, and an uppermost bracket assembly 10 could include locating pins 36 within the pin rest locations 80. In this way, the uppermost project clamp assembly 40 is approximately 30° below horizontal, the middle project clamp assembly 40 is approximately 60° below horizontal, and the lowermost project clamp assembly 40 is approximately vertical, meaning that little vertical space is required to be maintained between the bracket assemblies 10, but the project clamp assemblies 40 do not interfere with or contact each other.

Figures 18, 19:
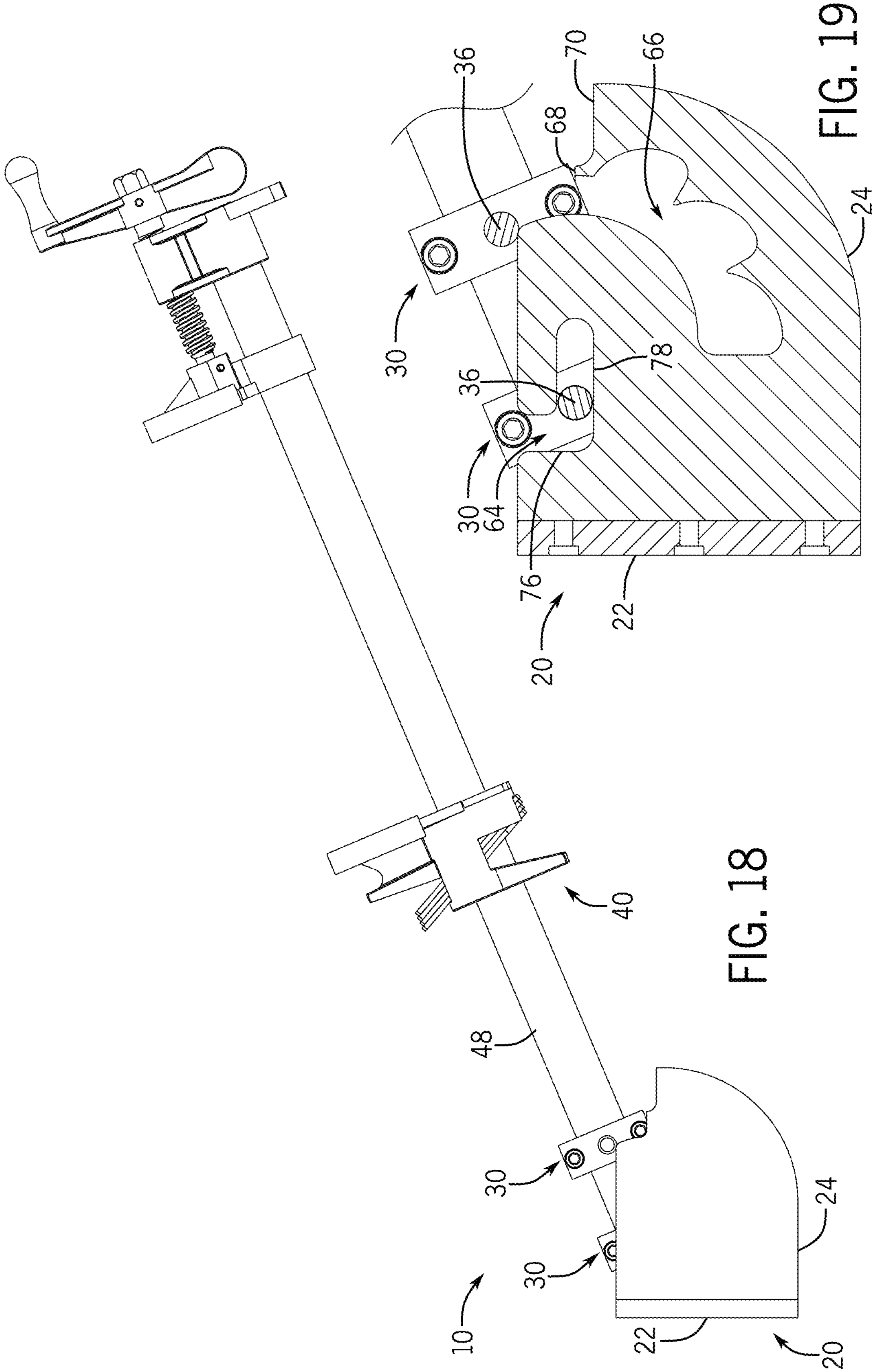
FIG. 18 is a side view of the clamped project bracket assembly in a clamp removal configuration.
FIG. 19 is a side cross-sectional view of the clamped project bracket assembly in the clamp removal configuration.

As shown in FIGS. 18 and 19, to fully remove the project clamp assembly 40 from the mounting bracket assembly 20, a user may lift the locating pins 36 out of the positioning tracks 64, and slide the locating pins 36 within the horizontal track portions 78 of the retention tracks 64 toward the mounting surface bracket component 22 until the locating pins 36 can be lifted out through the vertical track portions 76 of the retention tracks 64.

Figure 20:
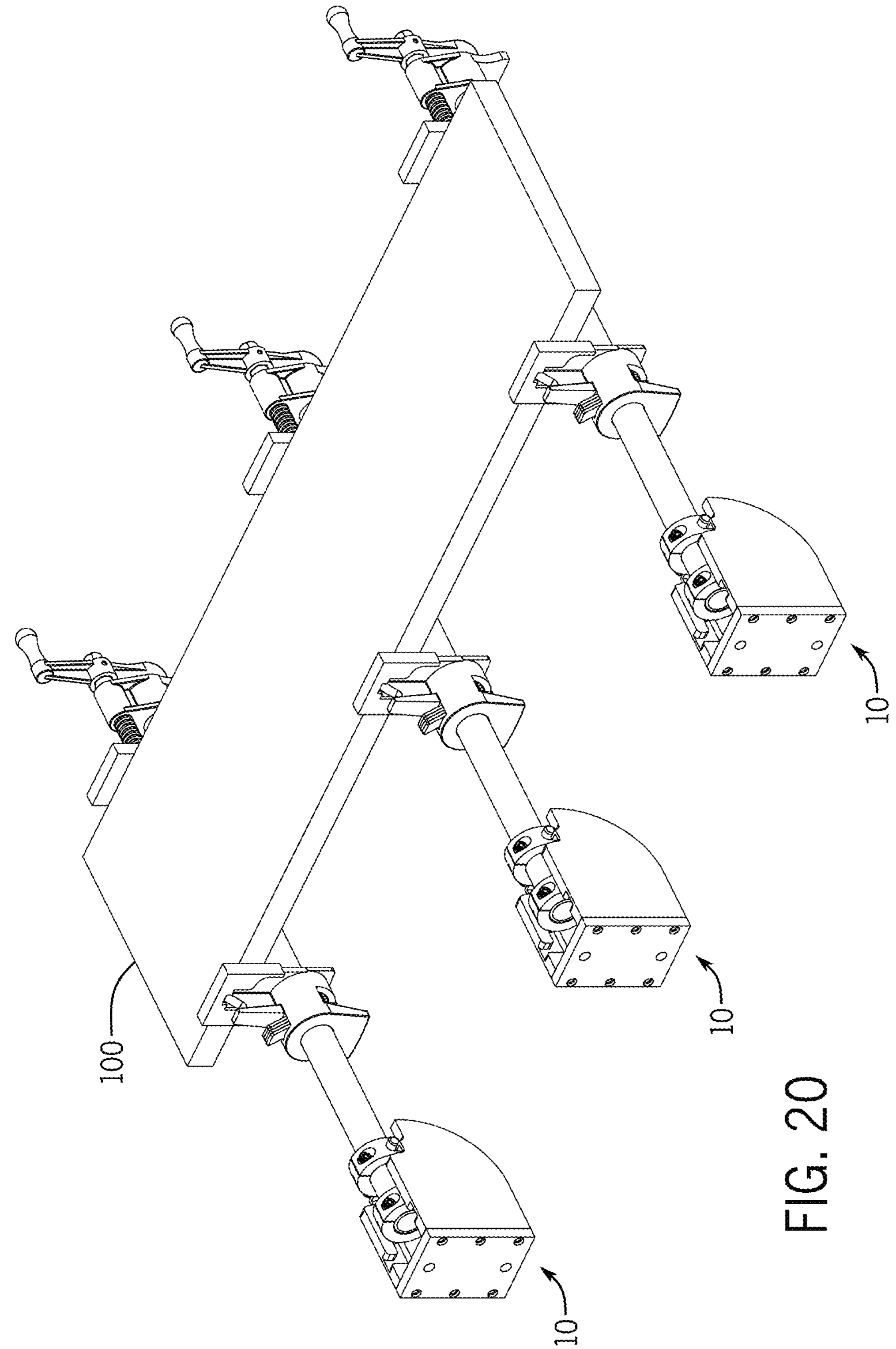
FIG. 20 is a perspective view of an exemplary implementation of the present disclosure using multiple clamped project bracket assemblies to clamp a project.

Referring now to FIG. 20, an implementation of the present disclosure using multiple clamped project bracket assemblies 10 is shown. If the project 100 to be clamped is too large for a single project clamp, two or more clamped project bracket assemblies 10 can be utilized in tandem to suspend the project 100 in each of the suspension configurations depicted in FIGS. 10-17 above. In such an implementation, a user may first position each of the bracket assemblies 10 such that locating pins 36 are positioned on the horizontal rest surfaces 70, as shown in FIGS. 10 and 11. Once the project 100 has been located within the project clamp assemblies 40 and the adjustment mechanisms 46 have been operated to apply clamping forces to the project 100, a user may rotate the project clamp assemblies 40 so that locating pins 36 are positioned within any desired pin rest locations 80-84 and the pipes 48 of the project clamp assemblies 40 are positioned at a desired angle from the horizontal.

FIGS. 21-26 depict an additional exemplary embodiment of the present disclosure that permits adjustable positioning of multiple mounting bracket assemblies 210 using threaded fasteners 206. Mounting assembly 200 is shown to include a mounting surface hat channel bracket 202 and a stiffening U-bracket 204. In various embodiments, the brackets 202, 204 may be permanently coupled to each other using a welding or riveting process. The hat channel bracket 202 is configured to couple to a preferably vertical mounting surface using multiple mounting holes 218 (see FIG. 22) formed in upper and lower mounting flanges 214, 216. In an exemplary embodiment, the hat channel bracket 202 further includes a pair of mounting tracks 220 formed in a main body flange 212 of the hat channel bracket 202.

Figure 24:
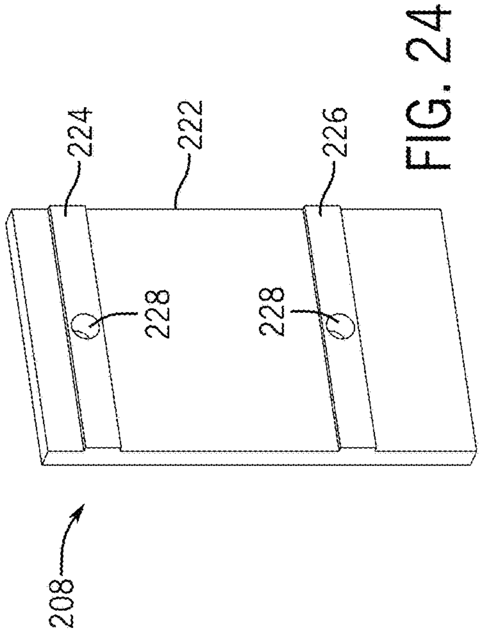
FIG. 24 is a perspective view of a mounting plate utilized with the mounting bracket assemblies shown in FIG. 21.
Figure 23:
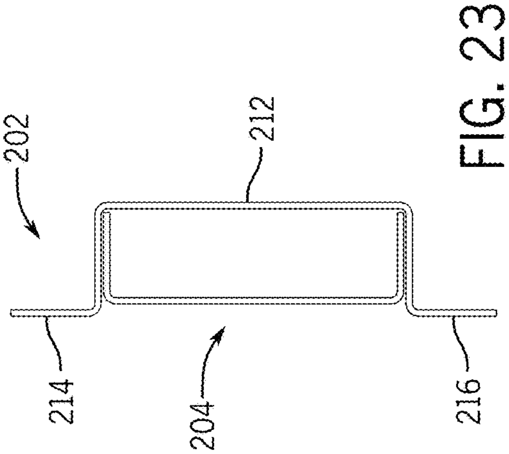
FIG. 23 is a side view of the adjustable track bracket of FIG. 22.

FIG. 24 depicts a perspective view of a mounting plate 208 that may be utilized to couple the mounting bracket assemblies 210 to the hat channel bracket 202 via the mounting tracks 220. Mounting plate 208 is shown to include a main body 222 with an upper extended portion 224 and a lower extended portion 226. Each of the portions 224, 226 is shown to include a threaded hole 228 that is configured to receive a threaded fastener 206 (see FIG. 21) that passes through mounting slots 252, 254 in mounting bracket assembly 210 (see FIG. 26). To modify the position of a mounting bracket assembly 210 relative to the hat channel bracket 202, the threaded fasteners 206 coupling the mounting bracket assembly 210 and the mounting plate 208 can be loosened such that the fasteners 206, mounting plate 208, and mounting bracket assembly 210 can slide within the mounting tracks 220. To fix the position of the mounting bracket assembly 210 relative to the hat channel bracket 202, the threaded fasteners 206 can be tightened.

Figure 25:
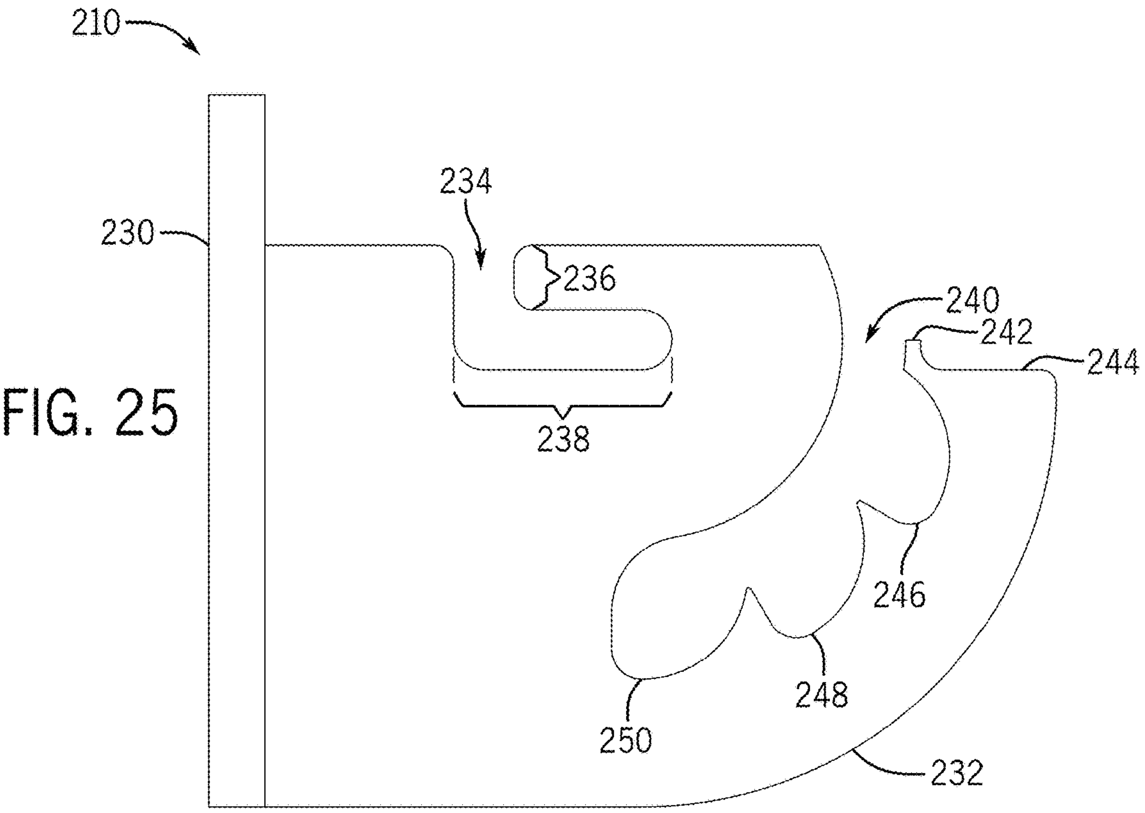
FIG. 25 is a side view of the mounting bracket assembly of FIG. 21.
Figure 26:
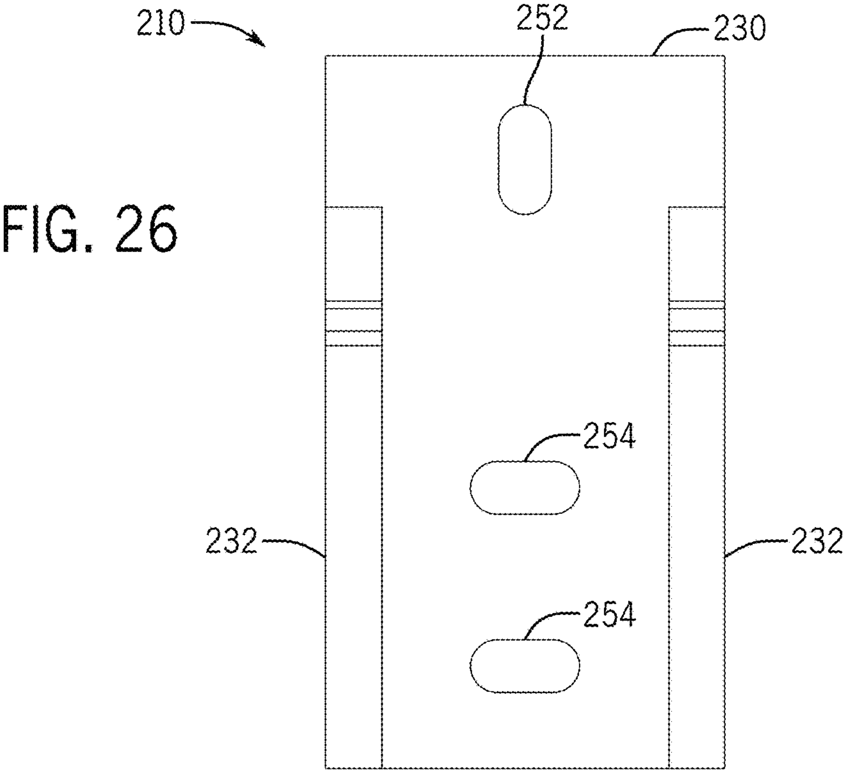
FIG. 26 is a front view of the mounting bracket assembly of FIG. 25.

FIGS. 25 and 26 respectively depict side and front views of mounting bracket assembly 210. In an exemplary implementation, mounting bracket assembly 210 is substantially similar to mounting bracket assembly 20, described above. Mounting bracket assembly 210 is shown to include a mounting surface bracket component 230 and a pair of side bracket components 232. Each of the side bracket components 232 is shown to include a pin retention track or groove 234 that comprises a vertical portion 236 and a horizontal portion 238. The side bracket components 232 each further include a pin positioning track or groove 240 that is spaced apart from the retention groove 234 and includes multiple pin rest locations 246, 248, 250 that permit a clamp assembly to be positioned generally 30°, 60°, and 90° relative to a horizontal plane. In other implementations, the pin positioning groove 240 may include different pin rest locations that permit a clamp assembly to be positioned at a different orientation relative to a horizontal plane (e.g.,) 45°. In contrast to the mounting bracket assembly 20 depicted above, each of the pin retention track 234 and the pin positioning track 240 are shown to extend through the full thickness of the side bracket components 232. The fully milled tracks 234, 240 may be preferred when the material of the side bracket components 232 is fabricated from a high yield strength material (e.g., aluminum).

Again, similar to the mounting bracket assembly 20 depicted above, the side bracket components 232 are shown to include horizontal rest surfaces 244 with filleted lips 242 extending therefrom that permit locating pins (e.g., locating pins 36) of suspension clamp assemblies to fit flush against the mounting bracket assembly 210 to load and unload a project into or from a project clamp assembly (e.g., project clamp assembly 40).

In the present description, certain terms have been used for brevity, clarity, and understanding. No unnecessary limitations are to be implied therefrom beyond the requirement of the prior art because such terms are used for descriptive purposes only and are intended to be broadly construed. The different assemblies described herein may be used alone or in combination with other systems. Various equivalents, alternatives, and modifications are possible within the scope of the appended claims. The methods herein are not limited to being performed in the order described, but could be performed in any logical order.

What is claimed is:

1. A clamped project bracket assembly, comprising:
- a first and a second suspension clamp assembly, each suspension clamp assembly comprising:
  - at least one suspension clamp portion configured to couple to a clamp assembly configured to hold a clamped project; and
  - a pair of locating pins extending from the at least one suspension clamp portion; and
- a mounting bracket comprising a pair of pin retention grooves and a pair of pin positioning grooves formed at least partially therethrough;
- wherein the pair of locating pins of the first suspension clamp assembly are configured to travel within the pair of pin retention grooves; and
- wherein the pair of locating pins of the second suspension clamp assembly are configured to travel within the pair of pin positioning grooves to position the clamp assembly at one of a plurality of discrete orientations.

2. The clamped project bracket assembly of claim 1, wherein the plurality of discrete orientations comprises at least two of the following orientations: generally 30° below a horizontal plane, generally 45° below the horizontal plane, generally 60° below the horizontal plane, and generally 90° below the horizontal plane.

3. The clamped project bracket assembly of claim 1, wherein each of the pair of pin retention grooves comprises a generally vertical portion and a generally horizontal portion.

4. The clamped project bracket assembly of claim 1, wherein the mounting bracket further comprises a pair of generally horizontal rest surfaces spaced apart from the pair of pin positioning grooves and configured to receive the pair of locating pins of the second suspension clamp assembly.

5. The clamped project bracket assembly of claim 4, wherein the mounting bracket further comprises a filleted lip extending from each of the horizontal rest surfaces.

6. The clamped project bracket assembly of claim 1, wherein the at least one suspension clamp portion comprises a pair of generally C-shaped or U-shaped clamp portions configured to detachably couple to the clamp assembly using a plurality of fasteners.

7. The clamped projected bracket assembly of claim 1, wherein the at least one suspension clamp portion is configured to fixedly couple to the clamp assembly.

8. A mounting bracket utilized in a clamped project bracket assembly, comprising:

a mounting surface bracket component configured to couple to a mounting surface; and a pair of side bracket components, each of the side bracket components comprising a pin retention groove and a pin positioning groove formed at least partially therethrough;

wherein each of the pin retention grooves is configured to receive a pin from a first suspension clamp assembly coupled to a clamp assembly configured to hold a clamped project; and wherein each of the pin positioning grooves is configured to receive a pin from a second suspension clamp assembly coupled to the clamp assembly.

9. The mounting bracket of claim 8, wherein each of the pin positioning grooves is configured such that travel of the pins from the second suspension clamp assembly within the pin positioning grooves permits positioning of the clamp assembly at one of a plurality of discrete orientations.

10. The mounting bracket of claim 9, wherein the plurality of discrete orientations comprises at least two of the following orientations: generally 30° below a horizontal plane, generally 45° below the horizontal plane, generally 60° below the horizontal plane, and generally 90° below the horizontal plane.

11. The mounting bracket of claim 8, wherein each of the pin retention grooves comprises a generally vertical portion and a generally horizontal portion.

12. The mounting bracket of claim 8, wherein each of the side bracket components further comprises a generally horizontal rest surface spaced apart from the pin positioning groove, wherein the generally horizontal rest surface is configured to receive a pin from the second suspension clamp assembly.

13. The mounting bracket of claim 12, wherein the mounting bracket further comprises a filleted lip extending from the horizontal rest surface.

14. A method for suspending a clamped project from a clamped project bracket assembly, the method comprising:

providing a mounting bracket comprising a pair of pin retention grooves and a pair of pin positioning grooves formed at least partially therethrough;

coupling a first and a second suspension clamp assembly to a clamp assembly configured to hold a clamped project, each suspension clamp assembly comprising at least one suspension clamp portion and a pair of locating pins extending from the at least one suspension clamp portion;

inserting the pair of locating pins of the first suspension clamp assembly into the pair of pin retention grooves; and inserting the pair of locating pins of the second suspension clamp assembly into the pair of pin positioning grooves to position the clamp assembly at one of a plurality of discrete orientations.

15. The method of claim 14, wherein the plurality of discrete orientations comprises at least two of the following orientations: generally 30° below a horizontal plane, generally 45° below the horizontal plane, generally 60° below the horizontal plane, and generally 90° below the horizontal plane.

16. The method of claim 14, wherein each of the pair of pin retention grooves comprises a generally vertical portion and a generally horizontal portion, and wherein inserting the pair of locating pins of the first suspension clamp assembly into the pair of pin retention grooves comprises inserting each locating pin into the generally vertical portion and sliding each locating pin through the generally horizontal portion.

17. The method of claim 14, wherein the mounting bracket further comprises a pair of generally horizontal rest surfaces spaced apart from the pair of pin positioning grooves, and wherein the method further includes removing the pair of locating pins of the second suspension clamp assembly from the pair of pin positioning grooves and resting the pair of locating pins of the second suspension clamp assembly on the pair of generally horizontal rest surfaces.

18. The method of claim 14, wherein the at least one suspension clamp portion comprises a pair of generally C-shaped or U-shaped clamp portions, and wherein coupling the first and second suspension clamp assemblies to the clamp assembly configured to hold a clamped project comprises detachably coupling the generally C-shaped or U-shaped clamp portions to the clamp assembly using a plurality of fasteners.

19. The method of claim 14, wherein coupling the first and second suspension clamp assemblies to the clamp assembly comprises fixedly coupling the first and second suspension clamp assemblies to the clamp assembly.

20. The method of claim 14, further comprising inserting the pair of locating pins of the second suspension clamp assembly into the pair of pin positioning grooves to position the clamp assembly at a second orientation of the plurality of discrete orientations.

* * * * *